United States Patent Office 2,754,294
Patented July 10, 1956

2,754,294

AZO PIGMENTS FROM DICHLOROTOLUIDINE SULFONIC ACIDS COUPLED TO BETA-NAPHTHOL

Delton W. Hein, Somerville, N. J., George R. Waitkins, Kirkwood, Mo., and Harold T. Lacey, Westfield, N. J., assignors to American Cyanamid Company, New York, N. Y., a corporation of Maine No Drawing. Application April 7, 1953, Serial No. 347,411

8 Claims. (Cl. 260—197)

The present invention relates to new pigments, and more especially, to new compounds of the formula:

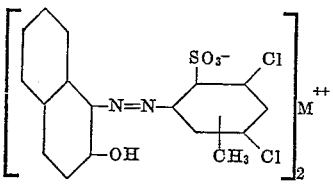

in which M is an alkaline earth metal. These pigments have valuable shades which range from yellow to red.

Colored printing is becoming more commonplace in the publishing business. The production of pigments for the inks used in such printing is consequently becoming important, and there are deficiencies in the properties of the pigments presently available. Among the most important red pigments used for this purpose are the 2-chloro-4-sulfo-5-aminotoluene and its isomer, 2-chloro-5-sulfo-4-aminotoluene, diazotized, coupled to beta-naphthol and converted into a metallic salt. These pigments, while excellent in many respects, are not as yellow in shade and have not as good a fastness to light as the trade would desire.

We have found that if one substitutes for one of the above bases a dichlorotoluidine sulfonic acid of the structure:

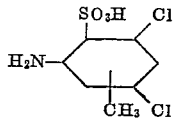

the alkaline earth salts of the diazonium compound are yellow-red to orange pigments of superior light fastness. This is a most surprising result, for there was no reason to predict that such a change in structure would shift the shade to the yellow. Halogens are usually regarded as auxochromic groups. Some of these pigments, as more fully revealed in the examples, are actually a pure golden yellow in shade. This is the first time, to our knowledge, that true yellow shades have been produced by coupling a substituted aniline on beta-naphthol.

Furthermore, one could not predict that this change would give better fastness to light. We do not know why these improved properties are inherent in this new class of compounds and do not wish to be restricted to any theory thereupon.

It is a further advantage of the new compounds of our invention that, in addition to being useable as pigments by themselves, they are powerful yellowing agents in blends with the usual pigments, such as those mentioned above, and with the lithol reds often used in printing inks. Such blends have greatly improved properties over the previous colorants for printing inks known to the art. They are much yellower—a very desirable property—and faster to light. The products of the present invention can be used as either a major or a minor component in such blends. The aminodichlorotoluene sulfonic acids are of particular value when blended in small proportions with other aromatic aminosulfonic acids and aromatic amines, such as aminonaphthalene sulfonic acids, chlorotoluidine sulfonic acids, aniline sulfonic acids, toluidines, and naphthylamines, and co-coupled with beta-naphthol as the coupling component. They can be used very effectively in minor amounts to shade to the yellow side products such as those obtained by coupling chlorotoluidine sulfonic acids or aminonaphthalene sulfonic acids on beta-naphthol, giving blends of good light-fastness.

The dichlorotoluidine sulfonic acids of the above formula can be prepared by reacting the corresponding dichlorotoluidines with chlorosulfonic acid in an organic solvent, followed by alkaline extraction of the precipitated product and reprecipitation with acid. The sulfonic acids thus obtained are diazotized, coupled with beta-naphthol, and the products converted to metallic salts by methods known to the art.

The pigments of this invention, obtained by diazotizing and coupling 2-amino-4,6-dichloro-5-methylbenzene sulfonic acid and 2-amino-4,6-dichloro-3-methylbenzene sulfonic acid with beta-naphthol followed by salt formation with an appropriate metal, are superior in lightfastness to the corresponding pigments of commerce prepared in like manner from the alkyl chloroaniline sulfonic acids, such as 2-amino-4-methyl-5-chlorobenzene sulfonic acid and 2-amino-4-chloro-5-methylbenzene sulfonic acid. In the present state of the art, it is not possible to explain this phenomenon, and the present invention is not limited to any specific theories.

Any metallic cation may be used for salt formation, although some are more valuable than others. The choice of metal exerts an appreciable influence on the shade and other properties of the product, and will depend on the application in view. It is to be understood, of course, that these represent only secondary shade differences in the basic yellow to orange-red color which is common to all the pigments of this class. Metals which have been found particularly desirable are those forming divalent cations, especially the alkaline earth metals, such as calcium, strontium, and barium.

The present invention is desirbed in further detail in the following examples. Parts are by weight unless otherwise specified.

Example 1

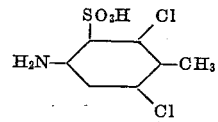

Twenty parts of 3,5-dichloro-4-methylaniline is dissolved in 195 parts of dichlorobenzene. This solution is stirred and 12.6 parts of chlorosulfonic acid are added slowly, the temperature being permitted to rise to about 70° C. The thick slurry is diluted with 26 parts of dichlorobenzene, and the mixture is heated gradually to a temperature of about 170° C. until the reaction is substantially complete. The mixture is cooled to room temperature, and the product is isolated by filtration and washing successively with dichlorobenzene. The crude product is dissolved in dilute sodium hydroxide, and the solution is treated with 10 parts of charcoal followed by clarification. The filtrate is acidified with concentrated hydrochloric acid, and the precipitated 2-amino-4,6-dichloro-5-methylbenzene sulfonic acid is filtered, washed, and dried.

Example 2

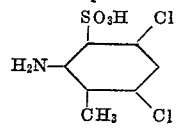

Twenty parts of 3,5-dichloro-6-methylaniline, 260 parts of dichlorobenzene, and 13 parts of chlorosulfonic acid are mixed, as described in Example 1. The reaction is carried out in the same manner as in that example, and the product is purified by alkaline solution and charcoal treatment. A good yield of 2-amino-4,6-dichloro-3-methylbenzene sulfonic acid is obtained.

*Example 3*

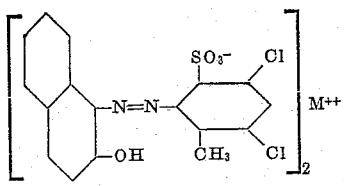

Two and fifty-six hundredths parts of the product of Example 2 is dissolved in 100 parts of water and 2.5 parts of 20% sodium hydroxide solution. The solution is cooled to 0° C. and acidified with 7 parts of 20% hydrochloric acid solution. The mixture is diazotized by the gradual addition of 10 parts of a normal sodium nitrite solution. The mixture is stirred at 0-2° C. until diazotization is complete. A solution of 1.6 parts of beta-naphthol in 100 parts of water and 3 parts of 20% sodium hydroxide solution is prepared by heating a mixture to 50–60° C. This solution is cooled to room temperature and added gradually to the cold diazo slurry. The yellow product is mixed with the appropriate metal ion and heated to 80–90° C. until precipitation of the heavy metal salt is complete. The product is isolated by filtration. A softer product is obtainable by adding a crude abietic acid to the hot mixture before isolation. The colors obtained are shown in the following table:

| Metallic cation: | Color |
|---|---|
| Barium | Golden yellow. |
| Calcium | Yellow. |
| Strontium | Golden yellow. |
| Magnesium | Do. |
| Cadmium | Do. |
| Nickelous | Do. |
| Zinc | Do. |
| Aluminum | Do. |
| Cupric | Olive red. |
| Plumbic | Golden yellow. |
| Zirconic | Brownish yellow. |

*Example 4*

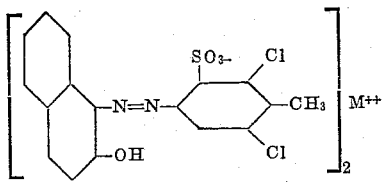

Two and fifty-six hundredths parts of the product of Example 1 is diazotized and coupled to beta-napthol followed by metallization with the appropriate metallic ion by the method used in Example 4. The colors obtained are indicated in the following table:

| Metallic cation: | Color |
|---|---|
| Barium | Bright orange red. |
| Calcium | Dark orange red. |
| Strontium | Do. |
| Magnesium | Bright orange red. |
| Cadmium | Slightly redder than barium salt. |
| Nickelous | Slightly lighter than barium salt. |
| Zinc | Slightly darker than barium salt. |
| Aluminum | Orange red. |
| Cupric | Reddish brown. |
| Plumbic | Redder than barium salt. |
| Zirconic | Similar to barium salt. |

We claim:
1. Compounds of the formula:

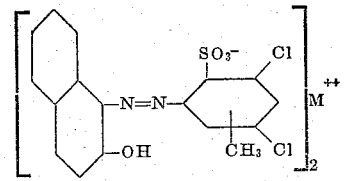

in which M is an alkaline earth metal.

2. Compounds of the formula:

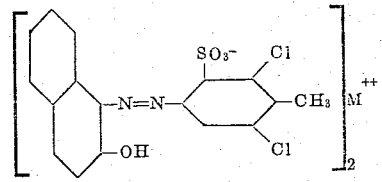

in which M is an alkaline earth metal.

3. Compounds of the formula:

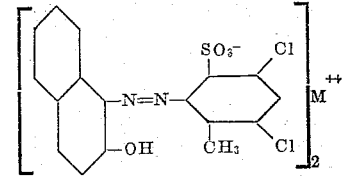

in which M is an alkaline earth metal.

4. The compound according to claim 2 in which $M^{++}$ is a calcium ion.

5. The compound according to claim 2 in which $M^{++}$ is a barium ion.

6. The compound according to claim 3 in which $M^{++}$ is a calcium ion.

7. The compound according to claim 3 in which $M^{++}$ is a barium ion.

8. The compound according to claim 2 in which $M^{++}$ is a strontium ion.

References Cited in the file of this patent
UNITED STATES PATENTS

| 759,716 | Julius et al. | May 16, 1904 |
| 787,767 | Julius et al. | Apr. 18, 1905 |
| 2,189,706 | Lang et al. | Feb. 13, 1940 |